United States Patent
Pohlman et al.

(10) Patent No.: US 6,346,878 B1
(45) Date of Patent: Feb. 12, 2002

(54) ELECTRONIC DISTANCE-DETERMINING APPARATUS AND ELECTRONIC SECURITY SYSTEM EQUIPPED THEREWITH

(75) Inventors: Andreas Pohlman, Weil der Stadt; Matthias Reinhardt, Winnenden, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/518,192

(22) Filed: Mar. 3, 2000

(30) Foreign Application Priority Data

Mar. 3, 1999 (DE) .......................... 199 09 140

(51) Int. Cl.⁷ ................................. B60Q 1/00
(52) U.S. Cl. .................. 340/435; 340/989; 340/903; 340/10.1; 340/10.3
(58) Field of Search ................. 340/435, 989, 340/991, 992, 901, 902, 903, 10.1, 10.3

(56) References Cited

U.S. PATENT DOCUMENTS

| | | | |
|---|---|---|---|
| 4,249,176 A | * 2/1981 | Oishi et al. | |
| 4,315,260 A | * 2/1982 | Kupfer | 342/42 |
| 5,293,160 A | * 3/1994 | Kurozu et al. | 340/825.31 |
| 5,533,045 A | 7/1996 | Hasegawa et al. | 375/200 |
| 5,673,018 A | * 9/1997 | Lowe et al. | 340/445 |
| 5,929,769 A | * 7/1999 | Garnault | 340/825.31 |
| 5,983,347 A | * 11/1999 | Brinkmeyer et al. | 340/435 |

FOREIGN PATENT DOCUMENTS

| | | |
|---|---|---|
| DE | 42 40 491 C2 | 6/1994 |
| DE | 44 36 605 A1 | 4/1995 |
| DE | 44 07 369 A1 | 9/1995 |
| DE | 44 36 983 A1 | 4/1996 |
| DE | 4440855 | 5/1996 |
| DE | 198 39 355 | 4/2000 |
| EP | 0568067 | 11/1993 |

* cited by examiner

Primary Examiner—Jeffery Mofsass
Assistant Examiner—Daniel Previl
(74) Attorney, Agent, or Firm—Crowell & Moring LLP

(57) ABSTRACT

An electronic apparatus for determining the distance between two objects has an interrogation signal generator for generating and transmitting an interrogation signal, and a response signal receiver. An evaluation unit is situated in one object, and interrogation signal reception means and response signal generation means in the other object. According to the invention, the evaluation unit is set up for determining a distance-indicative phase difference between the interrogation signal and the response signal. An electronic security system, such as a vehicle locking system of the keyless-go type, having a distance measurement of this type is also included.

7 Claims, 6 Drawing Sheets

ELECTRONIC DISTANCE-DETERMINING APPARATUS AND ELECTRONIC SECURITY SYSTEM EQUIPPED THEREWITH

BACKGROUND AND SUMMARY OF THE INVENTION

This application claims the priority of German patent document 199 09 140.4, filed Mar. 3, 1999, the disclosure of which is expressly incorporated by reference herein.

The invention relates to an electronic apparatus for determining the distance between two objects, and to an electronic security system equipped with such a distance-determining apparatus.

Electronic devices for measuring distance are known, for example in the form of propagation delay-measuring devices. In such instruments, a signal transmitted by one object (referred to herein as the interrogation signal) is reflected from the other object and returns as a reflected response signal to the signal-transmitting object. Thereafter, an evaluation unit determines the distance between the two objects based on a measured propagation time between transmission of the interrogation signal and receipt of the reflected response signal. Systems of this type, in which the response signal consists of a passively reflected signal, are described in the German patent documents DE 42 40 491 C2 and DE 44 07 369 A1.

German patent document DE 44 36 983 A1 discloses an apparatus of this type, which measures the distance between a vehicle and another object, e.g., a vehicle. A time-dilatated interrogation pulse generated by expansion of a temporally short interrogation pulse is emitted by one object and is received by the other object, where it is compressed back into the temporally short interrogation pulse. From the latter pulse a time-dilatated response pulse is generated and transmitted back to the first-mentioned object, where it is converted back into a short response pulse by compression. The time interval between the response pulse and the emitted short interrogation pulse is used as a measure of the distance between the two objects. The duration of the temporally short interrogation pulse and response pulse should be chosen to be short enough (e.g., a few nanoseconds) to allow a propagation delay of this type from the determination of the time interval between the two pulses for typical distances that are considered.

Modern motor vehicles, in particular passenger cars, are making increasing use of electronic security systems in the form of locking systems and/or electronic immobilizers which can be activated by the authorized vehicle user or users by means of an authentication element depending on the range or distance at which an authentication element that is valid for the relevant vehicle is situated relative to the vehicle. In so-called keyless-go systems, it is no longer necessary for the user to actively actuate the authentication element; rather, all that the user need do is carry the authentication element, which comprises a smart card for example, with him. Different security actions can be performed depending on where an associated identification sensor system detects an authorizing authentication element. A vehicle locking system of this type is described in the earlier German patent document DE 198 39 355, which was not published before the priority date.

In such locking systems and/or electronic immobilizers of vehicles (and in similar electronic object security systems) in which certain security actions are intended to be initiated depending on the distance between an authentication element and the object to be secured, there is a need to determine the distance between the authentication element and the object to be secured, in the simplest possible manner.

One object of the invention is to provide an electronic distance-determining apparatus of the type described above which, with relatively little outlay, makes it possible to determine even relatively short distances (as little as 1 m or even less).

Another object of the invention is to provide an electronic security system which is equipped with such a distance measurement apparatus, and can be designed, in particular, as a keyless-go system for a locking system and/or an electronic immobilizer of a motor vehicle.

These and other objects and advantages are achieved by the electronic distance-determining apparatus according to the invention, in which respective transmission and reception units are provided in both objects. The interrogation signal transmitted by a first of the two objects is received by the second object via its reception unit, after which the second object returns a response signal to the first object via its transmission unit. A suitable evaluation unit provided in the first object determines a phase difference between the emitted interrogation signal and the received response signal, which phase difference is indicative of the distance between the two objects, and from which the desired distance can then be determined.

By virtue of the active generation and emission of the response signal, the apparatus remains independent of the reflection properties of the object, in contrast to systems in which the response signal is merely a passively reflection from the relevant object. Moreover, by virtue of the evaluation of the phase difference between the interrogation and response signals, it is possible to determine even relatively short distances, on the order of 1 m or even less, with signals based on electromagnetic waves, without requiring that the interrogation and response signals be kept very short, in terms of time, for example by compression.

In one embodiment of the invention, a delay unit is provided in the first object, which internally delays the interrogation signal prior to the phase comparison with the returned response signal, by a period of time which corresponds to the signal processing time in the second object (that is, the time difference between the beginning of the reception of the interrogation signal and the beginning of the transmission of the response signal). This enables a correctly timed comparison between the interrogation signal and the response signal from the beginning of the distance-determining process, avoiding a phase difference between the interrogation and response signals caused by signal processing delay.

In another embodiment of the invention, a signal generation unit (triggered by the received interrogation signal) with a synchronizing PLL (phase-locked loop) circuit is provided in the second object to receive the interrogation signal, for the purpose of generating the response signal. This has the particular advantage of ensuring continual synchronization between the interrogation signal and the response signal, which avoids phase differences on account of frequency fluctuations of the signal generation unit that generates the response signal with regard to the interrogation signal.

According to another feature of the invention, the evaluation unit may comprise an exclusive-OR gate, to which the interrogation and response signals are fed via respective inputs. The exclusive-OR gate distinguishes the time periods with an identical signal level from those with a different signal level of the interrogation and response signals, and therefore generates an output signal which is representative of the phase difference between the two signals and can be further processed in a suitable manner. Such further processing may comprise, e.g., forming the root-mean-square value of the output signal of the exclusive-OR gate, after which the root-mean-square value that is generated represents a measure of the distance between the two objects.

In still another embodiment of the invention, such root-mean-square value formation is combined with a threshold value comparison unit. The threshold value comparison unit compares the root-mean-square value formed from the output signal of the exclusive-OR gate with a fixed or preferably variably predeterminable threshold value. The specification of the threshold value may serve for suppressing slight phase differences between the interrogation and response signals on account of signal processing tolerances of the various components of the apparatus, or for setting a threshold which corresponds to a distance threshold value, where the intention is to identify when the distance that is actually determined exceeds or falls below the distance threshold value. Thus, it is possible, for example, to ascertain whether the two objects are spaced apart from one another by more than a predeterminable maximum distance.

In still another embodiment, with an evaluating exclusive-OR gate, the further evaluation comprises charging a capacitor (provided for this purpose) with the output signal of the exclusive-OR gate. The rising capacitor voltage in the course of the charging process is compared with a fixed or preferably variably predetermined threshold value voltage in a threshold value comparison unit connected downstream. The time taken to charge the capacitor up to the threshold value voltage is then representative of a corresponding threshold value of the distance between the two objects. In this way, by way of example, a maximum distance can again be prescribed, and it is possible to ascertain whether or not the actual distance between the two objects exceeds the maximum distance.

Yet another embodiment of the invention permits the determination of relatively large distances, which correspond to phase differences between the interrogation and response signals of more than the width of an individual pulse of these signals that is typically used. (In such circumstances, the phase difference can no longer be unambiguously determined from a phase difference evaluation of a signal which comprises regularly successive individual pulses, owing to the periodicity.) To that end, the interrogation signal-transmitting object comprises a distance code word generation unit, which generates a predeterminable distance code word as a digital data word which is emitted as an interrogation signal, in this case for the purpose of determining a relatively large distance. The response signal which is generated as an identical data word response thereto in the other object is then checked by the evaluation unit with regard to a possible distance-dictated temporal offset relative to the interrogation signal data word. Even distance-dictated shifts between digital interrogation and response signals of more than 1 bit of the data word can be ascertained in this manner.

Finally, the invention also provides a security system which is equipped with a distance-determining apparatus of the type described above. With this system, it is possible to determine the distance between the authentication element (by which a user who carries it with him proves to the security system that he is authorized) and an object which is secured by one or more security units of the security system. In particular, the security system may be a locking system and/or electronic immobilizer of a motor vehicle designed as a keyless-go system. The determination of the distance between the authentication element and the object to be secured can be utilized, for example, to permit certain control commands for the security system only if the authentication element (and hence the system user who is carrying it with him) are within a predetermined distance of the object to be secured. It is also possible, as required, to define different distance ranges for different security actions of the security system.

Other objects, advantages and novel features of the present invention will become apparent from the following detailed description of the invention when considered in conjunction with the accompanying drawings.

DETAILED DESCRIPTION OF THE DRAWINGS

Figure 1:
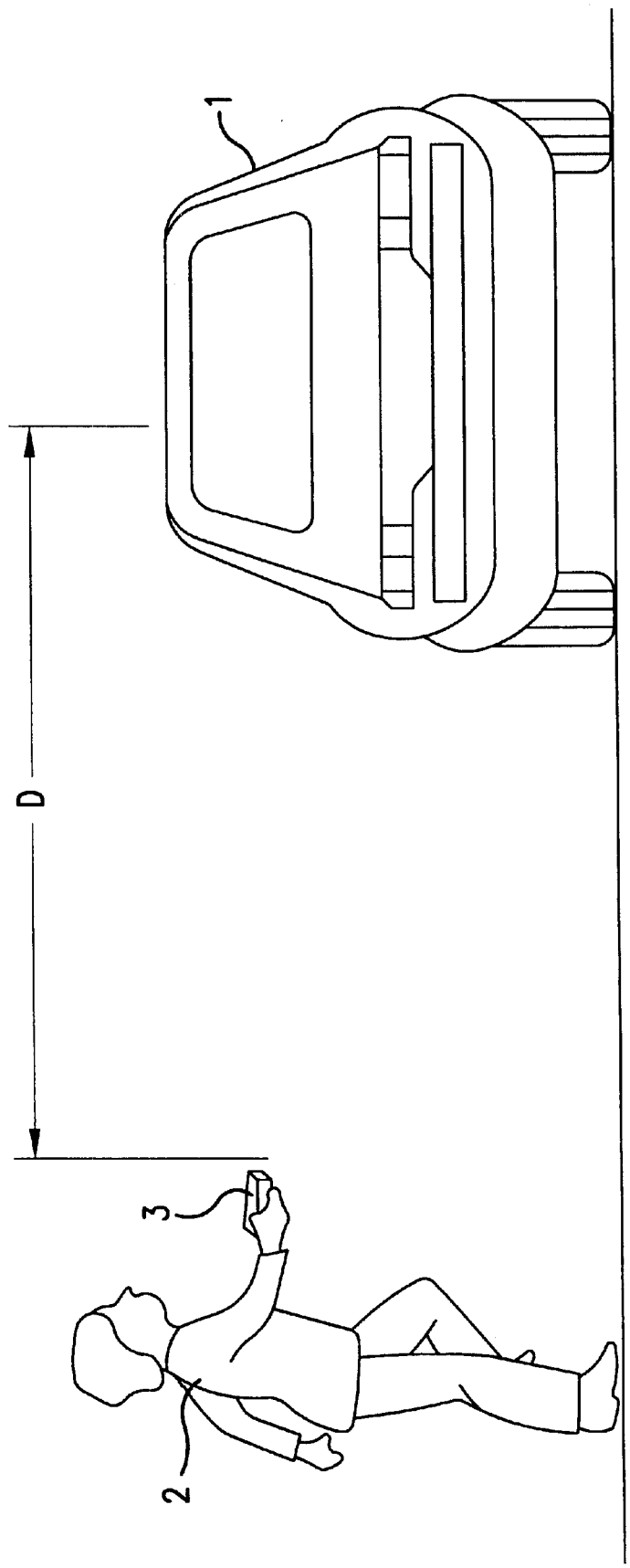
FIG. 1 is a schematic illustration of an authentication process involving the determination of the distance of an authentication element in a vehicle locking system of the keyless-go type with an electronic distance-determining apparatus.

FIG. 1 shows schematically a typical authentication process in a vehicle locking system which is designed as a keyless-go system. In this example, the locking system serves for securing access to a passenger car 1, which can be entered by a system user 2 only when an authentication element 3 which he carries with him is valid for the vehicle in question, as determined by means of the authentication process. The locking system is equipped with an electronic distance-determining apparatus by means of which it determines the distance D of the authentication element 3 which is communicating with its locking system section residing in the vehicle 1 via an associated radio link. This serves for initiating at least some of the various locking actions performed by the locking system for lockable and unlockable closure units, arranged on the vehicle doors and on the tailgate, dependent on the determined distance D of the authentication element 3.

By way of example, provision may be made for initiating a locking action by the locking system only if the authentication element 3 is not further than a predeterminable maximum distance from the vehicle 1. This maximum distance may be in the region of a few meters for example, which makes it possible, for example, to prevent the locking units from being put into the unlocked state when an authorized system user with a valid authentication element is still relatively far away from the vehicle 1 (so that an unauthorized person is thereby enabled to open the vehicle before the authorized system user arrives). The authentication element 3 may be realized by a smart card, a transponder or another unit that is familiar for this purpose. Instead of the keyless-go type, the vehicle locking system may also be of another type, in particular one in which the authentication elements are formed by so-called electronic keys which are to be actuated by the vehicle user.

Various advantageous possibilities are available for realizing the electronic distance-determining apparatus, which can be provided in a locking system of this type, and also in other security systems of motor vehicles (e.g., electronic immobilizers, or of other mobile or stationary objects to be secured, and generally for the purpose of determining the distance between two arbitrary objects). The possibilities are explained in more detail below with reference to FIGS. 2 to 6. All of these distance-determining apparatuses share the feature that they comprise an interrogation and evaluation section in one object (preferably in the vehicle 1 in the case of the locking system in accordance with FIG. 1), and a response section in the other object (in the authentication element 3 in the case of FIG. 1). The interrogation and evaluation section generates an interrogation signal and emits the latter, while the response section receives the transmitted interrogation signal and, in response thereto, generates and returns an associated response signal. The interrogation and evaluation section then determines a phase difference between the interrogation signal and the response signal, which phase difference is representative of the distance between the said interrogation and evaluation section and the response section. The distance between the two objects in which the interrogation and evaluation section and the response section are accommodated can be determined from this information.

Assuming a distance of 5 m, and further assuming that the interrogation and response signals propagate in the form of electromagnetic waves at the speed of light, the result is a straightforward propagation delay for the forward travel of the interrogation signal and the return travel of the response signal of approximately 33 ns. This means that the interrogation and response signals and the evaluation section which evaluates them must be designed so that phase differences between the interrogation and response signals which correspond to such propagation delay differences on the order of magnitude starting from a few nanoseconds, can be reliably identified. In this case, the distance-determining apparatus is designed in such a way that the interrogation and response signals need not each comprise just one individual pulse whose propagation delay difference is measured. Rather, each may be constructed from pulse trains whose mutual phase difference is determined.

Figure 2:
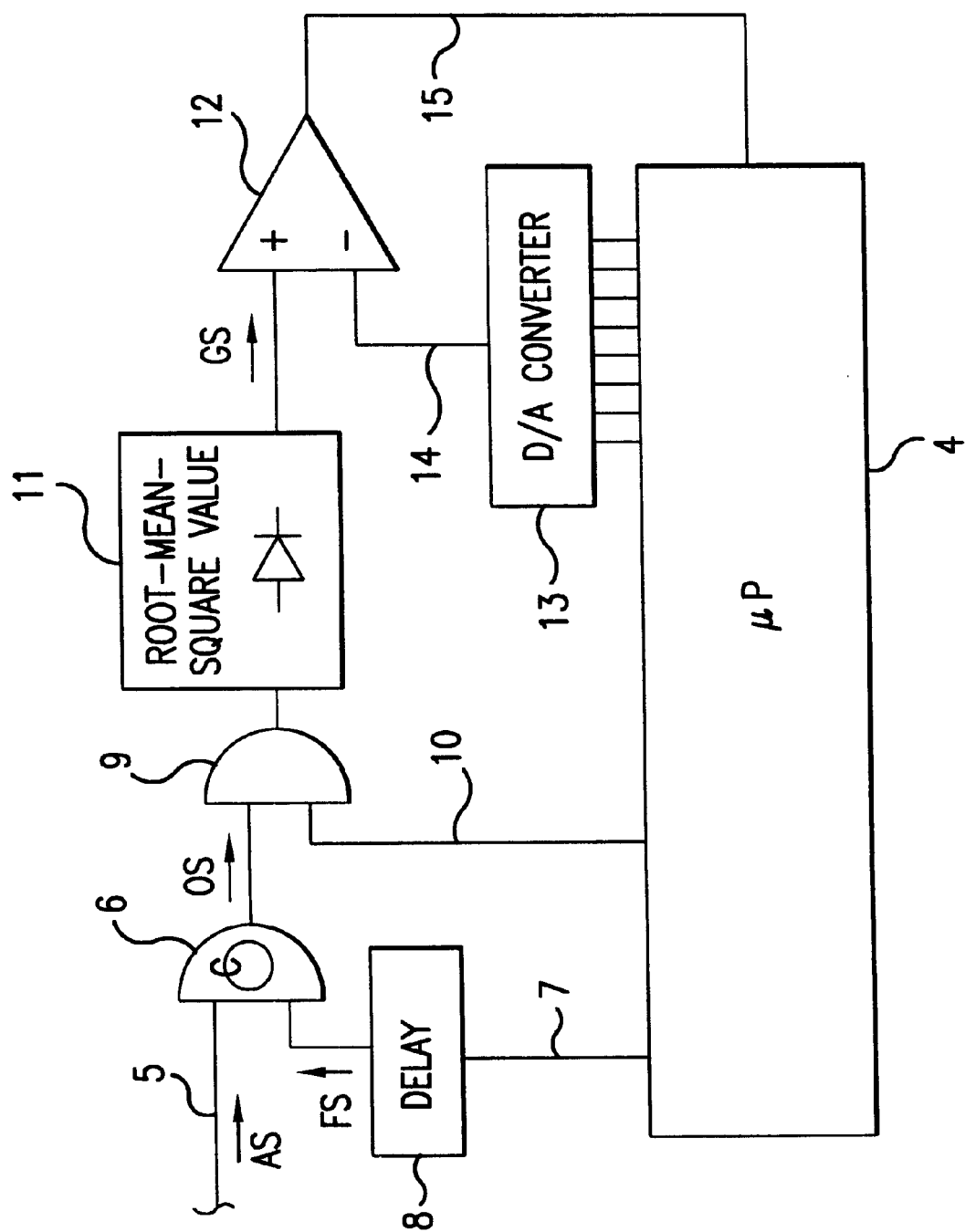
FIG. 2 is a block diagram of an interrogation and evaluation section, residing in the vehicle, of the distance-determining apparatus used for the vehicle locking system of FIG. 1.

A first realization of an interrogation and evaluation section which is suitable for this purpose is illustrated in FIG. 2. The central element which this interrogation and evaluation section contains is a microprocessor 4, which generates a square-wave pulse signal FS, represented in the second diagram from the top in FIG. 3 as an interrogation signal, and emits it in a conventional manner (not shown in any detail) via a transmission unit (not shown).

Figure 3:
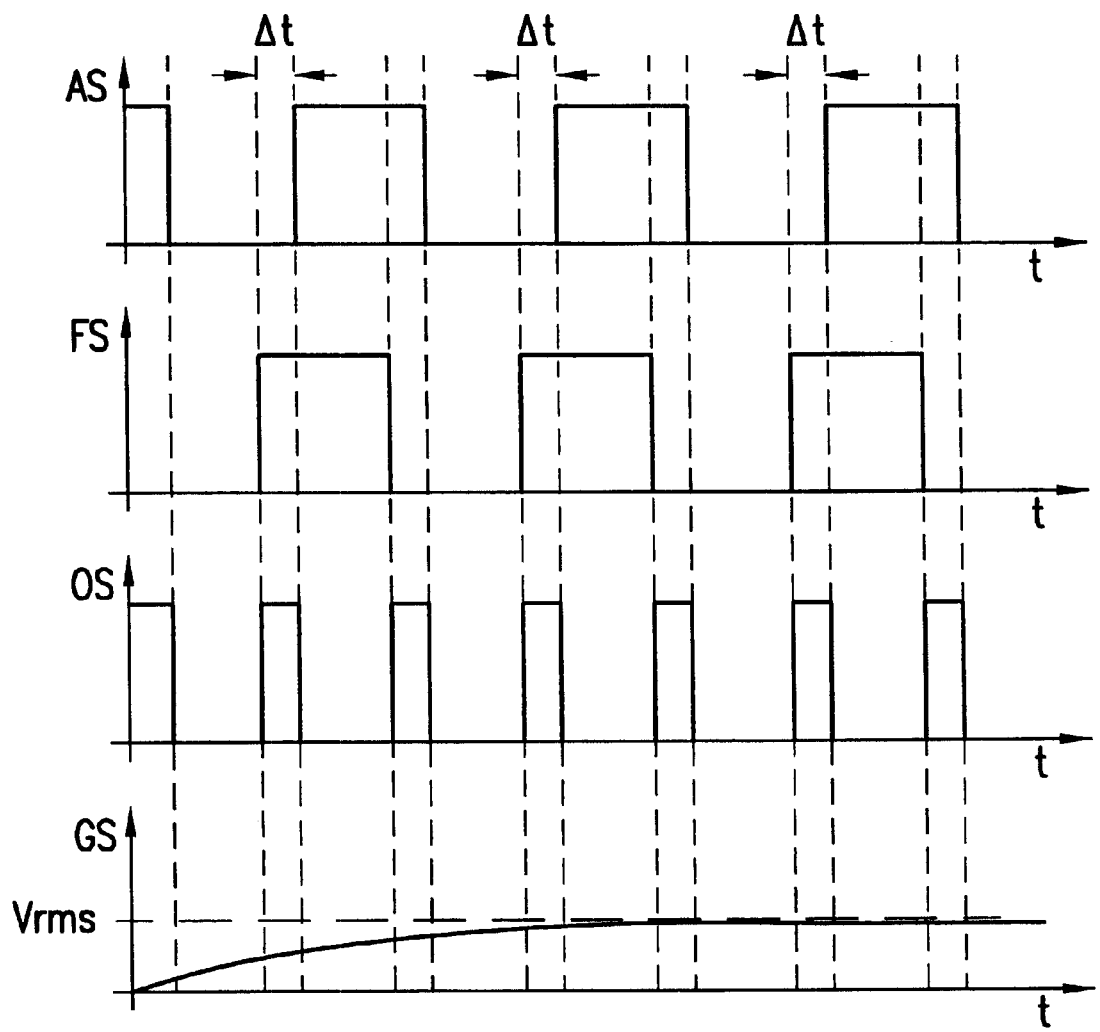
FIG. 3 shows signal characteristic diagrams for illustrating the method of operation of the interrogation and evaluation section of FIG. 2.

After receiving the interrogation signal, transmitted by the microprocessor 4, via an associated reception unit, the response section, which is spaced apart from the interrogation and evaluation section by the distance sought to be measured, generates an identical response signal AS, as is represented in the topmost diagram in FIG. 3, and emits it via an associated transmission unit. The interrogation and evaluation section receives the response signal AS via a reception unit (not shown), which feeds it via a response signal line 5 to a first input of an exclusive-OR gate 6. In parallel therewith, the microprocessor 4 outputs the interrogation signal that it generates via a delay line 7 to a signal processing unit 8, which is designed in such a way that it delays the interrogation signal FS precisely by the signal processing time required by the response section for signal processing from the beginning of the reception of the interrogation signal FS until the beginning of the transmission of the response signal AS.

The interrogation signal FS that has been delayed in such a way is output to a second input of the exclusive-OR gate 6 by the delay unit 8. Consequently, the interrogation signal FS and the response signal AS are present at the two inputs of the exclusive-OR gate 6 in a form in which any phase difference component caused by the signal processing time in the response section is compensated for. Consequently, presupposing synchronism between the interrogation signal FS and the response signal AS, a phase difference Dt, as is assumed by way of example in the diagrams in FIG. 3, which lie one above the other synchronously in time, can be attributed solely to the distance between the interrogation and evaluation section, on the one hand, and the response section, on the other hand. As long as the distance sought does not correspond to a signal propagation delay difference which is greater than the periodicity length of the interrogation and response signals FS, AS, the phase difference Dt that occurs is thus an unambiguous measure of the said distance.

From the corresponding logic combination of the fed-in response signal AS and of the suitably delayed interrogation signal FS, as are illustrated for an exemplary case in the top two diagrams in FIG. 3, the exclusive-OR gate 6 generates an output signal OS, as is represented for the example of FIG. 3 in the second from bottom diagram therein. In accordance with the exclusive-OR function chosen, the output signal is at high level only when one of the interrogation signal FS and the response signal AS, is at high level, and the other is at low level In other words, the output signal OS of the exclusive-OR gate 6 consists of square-wave pulses with a pulse width corresponding to the distance-dictated phase difference Dt. In this way, it carries the phase difference information within itself.

The output signal OS of the exclusive-OR gate 6 is fed to an input of a downstream AND gate 9, the other input of which has an associated control signal of the microprocessor 4 applied to it via a control line 10. The AND gate 9 serves merely for controlling the periods of time with regard to which distance evaluation is intended to be effected by the further processing of the output signal OS of the exclusive-OR gate 6. It is precisely for these periods of time that the microprocessor 4 applies a high signal level to the associated input of the AND gate 9, with the result that the AND gate 9 allows the output signal OS of the exclusive-OR gate 6 to pass, while this signal forwarding remains inhibited as long as the microprocessor 4 applies a low signal level to the associated input of the AND gate 9.

The AND gate 9 is followed by a root-mean-square value forming unit 11, which transforms the square-wave pulse output signal OS of the exclusive-OR gate 6 into a DC voltage signal GS, represented in the example of FIG. 3 by the solid line in the bottommost diagram therein. Specifically, the initial rise of the DC voltage signal GS up to the root-mean-square voltage value Vrms of the output signal OS of the exclusive-OR gate 6 is illustrated therein. Since this root-mean-square value Vrms depends unambiguously on the pulse width of this output signal OS, it is, in the same way as the width of the square-wave pulses thereof, a measure of the sought distance between the two objects. Consequently, the object distance that is sought can be determined from the root-mean-square voltage value Vrms that results.

Furthermore, a threshold value comparison unit in the interrogation and evaluation section of FIG. 2 compares the root-mean-square voltage value Vrms with a variably predeterminable threshold value. To that end, the threshold value comparison unit comprises a comparator 12, which receives at its non-inverting input the output signal GS of the root-mean-square value forming unit 11. A threshold value voltage is applied to its inverting input, by the microprocessor 4 via a D/A converter 13 and a threshold value line 14. The respectively desired voltage threshold value can be adjusted in a variable manner by means of the microprocessor 4. Depending on whether the root-mean-square value Vrms, determined by the root-mean-square value forming unit 11, of the output signal OS of the exclusive-OR gate 6 is greater or less than the set voltage threshold value, the comparator 12 outputs different output signals to the microprocessor 4 via an evaluation line 15.

The threshold value comparison unit can be used to compensate for tolerances of the various system components, in particular of the delay unit 8, and the signal processing time in the response section. For this purpose, at the respective real system, a corresponding voltage threshold value is set which compensates for a phase difference between the interrogation signal FS and the response signal AS, caused by such manufacturing or operating tolerances, and not attributable to the finite signal propagation delay of the interrogation and response signals between the interrogation and evaluation section, on the one hand, and the response section, on the other hand.

Furthermore, in addition or as an alternative to this measure which corrects tolerances, provision may be made for using the threshold value comparison unit to define a distance threshold value by setting a corresponding voltage threshold value. As revealed in the above description of the various signals, the associated distance threshold value rises in this case as the voltage threshold value increases. The microprocessor 4 can then use the comparator output signal to identify whether the actual currently measured distance is greater or less than the predetermined distance threshold value, in order to perform various further control measures dependent thereon. Thus, in the locking system of FIG. 1, it may be provided, in this way, that a certain maximum distance between the authentication element 3 and the vehicle 1 is prescribed and a locking action of the locking system is initiated only when the authentication element 3 is no farther than the predetermined maximum distance from the vehicle 1.

Figure 4:
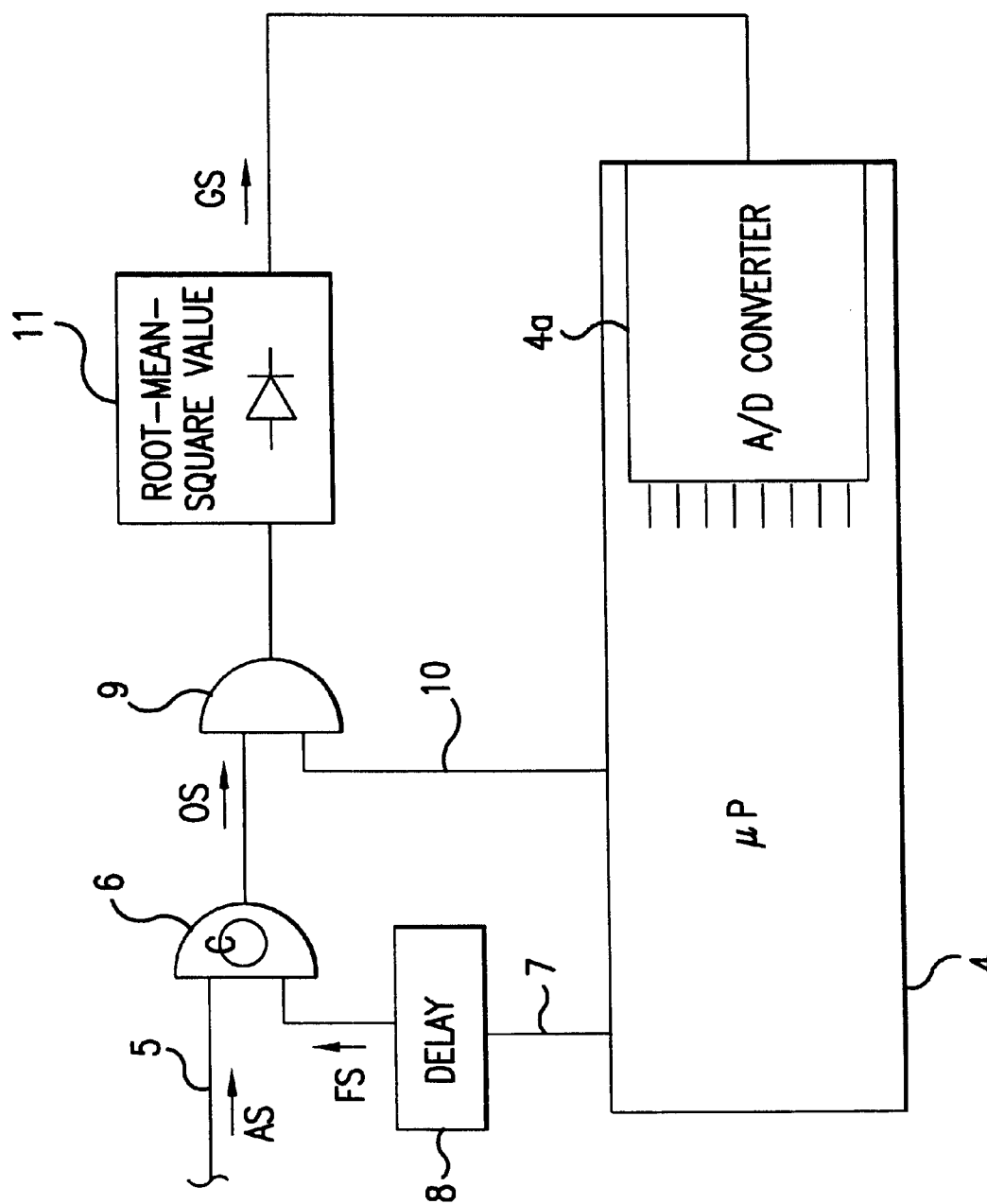
FIG. 4 shows a block diagram of a variant of the interrogation and evaluation section of FIG. 2.
Figure 5:
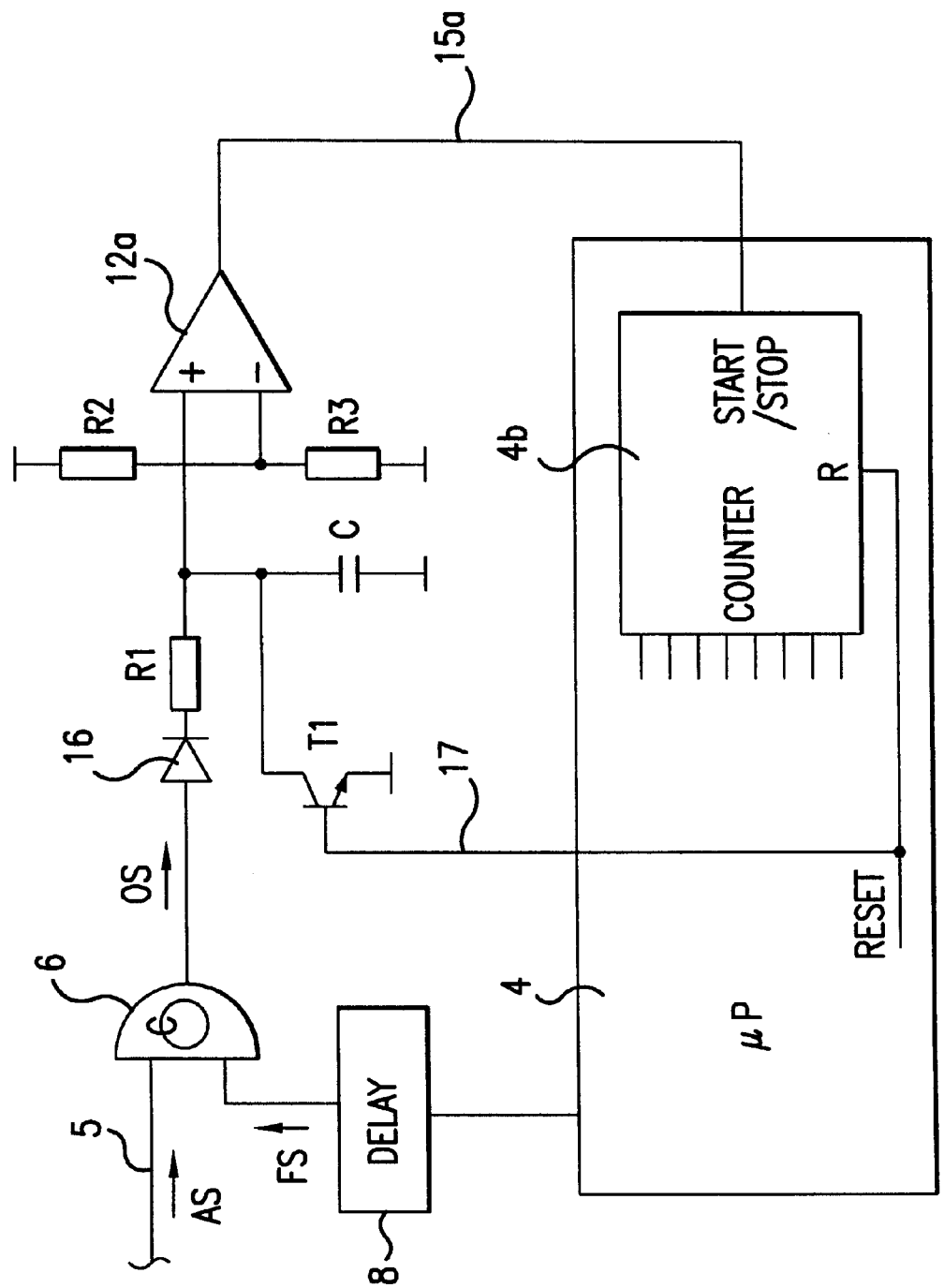
FIG. 5 shows a block diagram of a further variant of the interrogation and evaluation section of FIG. 2.

FIGS. 4 and 5 illustrate two further embodiments of the interrogation and evaluation section of the distance-determining apparatus, which are similar to FIG. 2. The same reference symbols are used for functionally identical elements and, in this respect, reference can be made to the above description relating to FIG. 2.

The interrogation and evaluation section of FIG. 4 corresponds to that of FIG. 2, except that the threshold value comparison unit is completely integrated in the microprocessor 4 and the analogue comparator 12 and also the D/A converter 13 of FIG. 2 are omitted. This system design may be chosen for the case where the microprocessor 4 contains an integrated A/D converter 4a, to which the output signal GS of the root-mean-square value forming unit 11 is then fed. This integrated A/D converter 4a converts the analogue root-mean-square voltage value Vrms of the output signal GS of the root-mean-square value forming unit into an associated digital value which can be compared with a digitally predetermined voltage threshold value by the microprocessor 4 itself. Otherwise, the above explanations of the threshold value comparison unit of FIG. 2 apply in the same way to the threshold value comparison unit which is integrated in the microprocessor 4 in the case of FIG. 4.

In the case of the embodiment of FIG. 5, the output signal OS of the exclusive-OR gate 6 is evaluated by way of the determination of the charging time of a capacitor. To that end, the output signal OS is passed via a diode unit 16 and a resistor R1 to a terminal of a capacitor C, the opposite terminal of which is connected to ground. A switching transistor T1 arranged in parallel with the capacitor C can be selectively switched on and off by the microprocessor 4 by means of a control signal passed via a control line 17 to the base of the transistor T1. This serves to reset the evaluation section to the starting state once an evaluation process has ended, by completely discharging the capacitor C. For this purpose, the switching transistor T1 is switched to its conducting state.

In order to carry out a distance-determining process, the switching transistor T1 is turned off, and the capacitor C is then charged by the successive square-wave pulses of the output signal OS of the exclusive-OR gate 6, at a rate which depends on the phase difference between the interrogation signal FS and the response signal AS. The time that elapses until a specific capacitor voltage value is reached is thus representative of the phase difference between the interrogation signal FS and the response signal AS and hence for the object distance sought. In the example of FIG. 5, this is evaluated, once again with the aid of a threshold value comparison unit, by determining when the voltage across the capacitor C exceeds a variably predeterminable voltage threshold value.

In this case, the threshold value comparison unit comprises a comparator 12a, to whose non-inverting input the capacitor voltage is applied, while the threshold value voltage is present at its inverting input, which threshold value voltage can be set to a desired value by means of a voltage divider formed by two resistors R2, R3. The comparator output signal fed to the microprocessor 4 via an evaluation line 15a changes at the instant at which the capacitor voltage exceeds the threshold value voltage. In the microprocessor 4, the comparator output signal is passed to a start/stop terminal of an internal counter 4b, which is started when a distance-determining process is initiated. As soon as the capacitor voltage rises above the threshold value voltage, the consequently changing comparator output signal stops the counter 4b, from which it is thus possible to read the capacitor charging time from which the associated object distance is then derived. As the object distance decreases, the capacitor charging time increases in this case owing to the square-wave pulses (becoming narrower) of the output signal OS of the exclusive-OR gate 6. The counter 4b is reset by the same control signal with which the microprocessor 4 switches on the switching transistor T1. As soon as this resetting control signal is no longer present for the purpose of beginning an evaluation process, the counter 4b starts to run.

Figure 7:
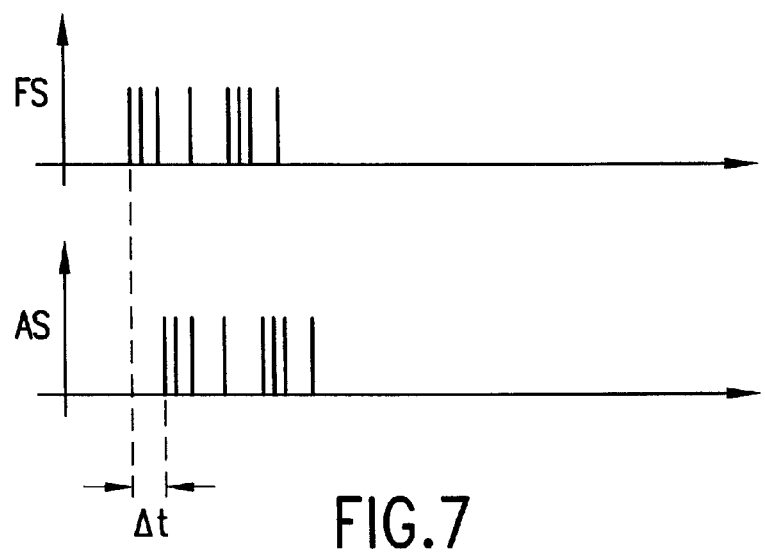
FIG. 7 shows a wave diagram of respective interrogation and response signals which are generated in the form of code words.

As mentioned, with the exemplary embodiments described above, unambiguous determination of distance is possible only as far as integer multiples of the periodicity length of the phase difference between the interrogation signal and the response signal and thus up to a certain maximum distance of e.g. up to approximately 100 m. For measuring larger distances (e.g., more than 100 m), the microprocessor in the interrogation and evaluation section generates an interrogation signal in the form of a predeterminable digital code word. In the response section, when the code word has been received, an identical code word is generated and returned as the response signal. (See FIG. 7.) The response signal code word received by a reception unit of the interrogation and evaluation section can be fed directly to the microprocessor for evaluation. In parallel therewith, the microprocessor feeds a contemporaneous copy of the emitted interrogation signal code word to the signal delay unit, which conducts it back to the microprocessor again in a manner such that it is delayed by the signal processing time in the response section. The microprocessor then checks the delayed interrogation signal code word and the response signal code word for correspondence or for any temporal shift in the two code words.

Since the individual pulses in the code word succeed one another bit by bit differently and not simply periodically, by virtue of this code word comparison it is also possible to identify a propagation delay-caused (and hence distance-caused) temporal shift between the interrogation signal and response signal code words of more than 1 bit, with the result that even larger distances can be reliably determined by this procedure. In this case, the specification of a desired distance threshold value may likewise be provided again, in particular in the form of a predetermined maximum bit shift between the interrogation signal and response signal code words. Thus, provision may be made e.g. for defining the object distance which corresponds to a bit shift of 1 bit as the distance threshold value, that is to S say, depending on whether the compared code words are temporally shifted by more or less than 1 bit, for implementing different measures in accordance with the fact that the two objects are then at a distance from one another which is respectively greater or less than the distance threshold value.

Figure 6:
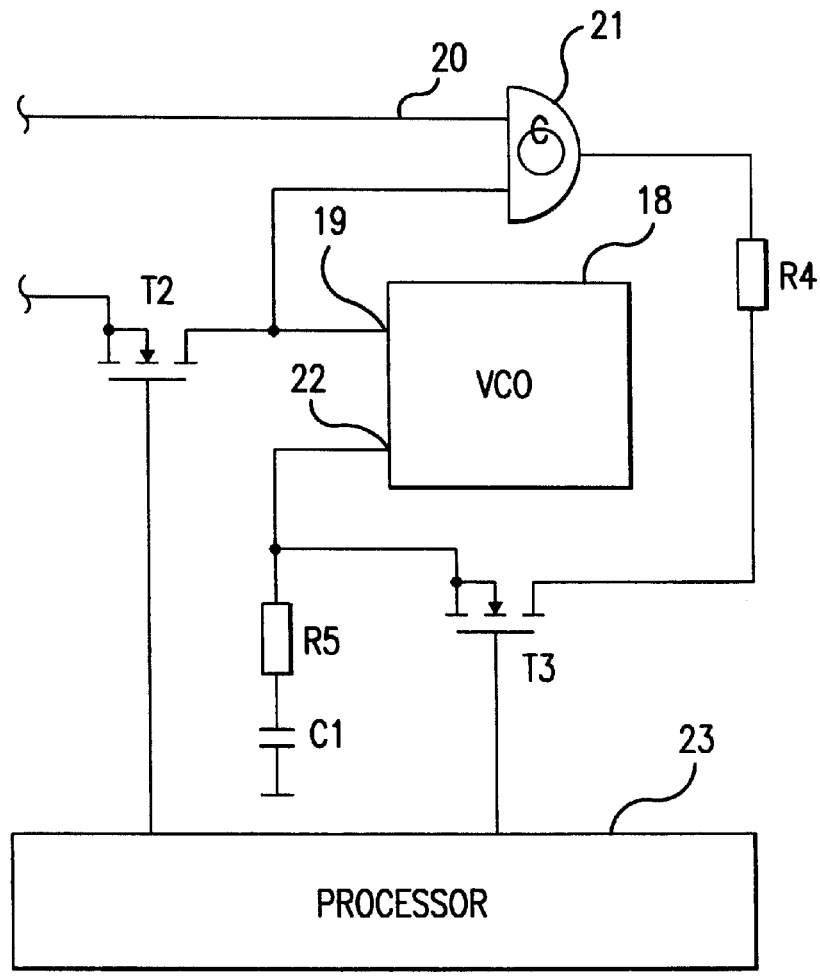
FIG. 6 shows a block diagram of a response section, arranged in the authentication element, of the distance-determining apparatus used for the vehicle locking system of FIG. 1.

The accuracy of the distance determination, which is of importance in particular for relatively small distances, can be increased by ensuring that the synchronization of the response signal returned by the response section relative to the interrogation signal is kept as exact as possible. This is because deviations from this synchronism can lead to phase differences between the interrogation and response signals which are not dictated by distance. One advantageous possibility for ensuring that the response signal is synchronized with the interrogation signal is provided by a design of the response section as illustrated in FIG. 6. The response section of the distance-determining apparatus which is shown therein comprises, for generating the response signal, a voltage-controlled oscillator (VCO) 18, whose signal output 19 is passed via a first field-effect switching transistor T2 to a transmission unit (not shown) which emits it as the response signal. The interrogation signal transmitted by the interrogation and evaluation section is received by the response section via a reception unit (not shown) and is fed from the latter via an interrogation signal line 20 to one input of an exclusive-OR gate 21, whose other input receives the output signal of the voltage-controlled oscillator 18. The output signal of exclusive-OR gate 21 is applied via a first resistor R4 and a second field-effect switching transistor T3 to a control input 22 of the voltage-controlled oscillator 18, which, at the other end, is coupled via a second resistor R5 and a capacitor C1 to ground.

As is evident from FIG. 6, the two resistors R4, R5 and the capacitor C1 form a low-pass filter for the output signal of the exclusive-OR gate 21. Moreover, the exclusive-OR gate 21, together with this low-pass filter and the voltage-controlled oscillator 18, forms a PLL circuit by means of which the response section generates and emits an identical response signal phase-locked with respect to the received interrogation signal. In this case, the voltage-controlled oscillator 18 and the exclusive-OR gate 21 may be jointly contained in a conventional integrated circuit module. The two switching transistors T2, T3 are controlled by a microprocessor 23 of the response section, where the following method of operation can be realized.

As soon as an interrogation square-wave pulse signal transmitted by the interrogation and evaluation section is received by the response section and is present at the relevant input of the exclusive-OR gate, it generates, by means of the low-pass filter R4, R5, C1, a corresponding root-mean-square voltage value at the control input 22 of the voltage-controlled oscillator 18. Thereupon, the oscillator starts to provide, at its output 19, a square-wave pulse signal corresponding to the received response signal. In this case, the first field-effect switching transistor T2 initially remains open and the second field-effect switching transistor T3 remains closed. The PLL circuitry, in which the output signal of the voltage-controlled oscillator 18 is compared with the received response signal in terms of its phase angle in the exclusive-OR gate 21, ensures that the output signal of the voltage-controlled oscillator 18 is provided in a phase-locked manner with the received response signal without phase shift with respect to the same.

Before receipt of the interrogation signal square-wave pulses ceases, the second field-effect switching transistor T3 is opened in good time, so that the capacitor C1 maintains a constant voltage at the control input 22 of the voltage-controlled oscillator 18. With the aid of this voltage the oscillator 18 continues to generate an output signal which is identical and phase-locked with respect to the interrogation signal. By closing the first field-effect switching transistor T2, this synchronized output signal of the voltage-controlled oscillator 18 is forwarded as the response signal to the transmission unit, where it is transmitted as the response signal to the interrogation and evaluation section. The synchronization of the response signal with the interrogation signal using the PLL circuit ensures that during the comparison of the response signal and the interrogation signal, phase differences between the two signals which occur in the interrogation and evaluation section are attributable solely to distance and are therefore representative of the respective object distance.

It is apparent that the signal synchronization described with regard to FIG. 6 is suitable both for the periodic square-wave pulse signals which are used especially for relatively short distances, and for the abovementioned code word signals which can be used as an alternative or in addition to the periodic square-wave pulse signals, preferably in the case of relatively large distances.

Also, the above-described embodiments, and further embodiments which are possible for a person skilled in the art, of the electronic distance-determining apparatus according to the invention are suitable not only, as shown, for locking systems and electronic immobilizers of motor vehicles for determining the distance of an authentication element, but also, as mentioned, for any other applications in which the intention is to determine the distance between a first object equipped with a corresponding interrogation and evaluation section and a second object equipped with an associated response section.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. Apparatus for determining a distance between first and second objects, comprising:
   an interrogation signal generator situated on the first object for generating and transmitting an interrogation signal;
   an interrogation signal receiver for receiving the interrogation signal and a response signal generator for generating and transmitting in response to reception of the interrogation signal, a response signal that is substantially congruent to said interrogation signal, delayed by a signal processing duration of said response signal generator, both the interrogation signal receiver and the response signal generator being situated on the second object;
   a response signal receiver situated on the first object, for receiving the response signal;
   a signal delay unit situated on the first object, to which signal delay unit the generated interrogation signal is fed in parallel with an interrogation signal transmission unit, and which signal delay unit forwards the said interrogation signal, delayed by a time duration that corresponds to the signal processing duration of the response signal generator, for comparison with the received response signal; and
   an evaluation unit which compares the delayed interrogation signal forwarded by the signal delay unit with the received response signal, and determines the distance between the first and second objects by determining a distance-indicative phase difference between the delayed interrogation signal forwarded by the signal delay unit and the transmitted response signal.

2. The distance-determining apparatus according to claim 1, wherein the response signal generator comprises a PLL circuit with a signal generation unit, which is triggered by a received interrogation signal, and generates a response signal which is synchronous with respect thereto.

3. Apparatus for determining a distance between first and second objects, comprising:
   an interrogation signal generator situated on the first object for generating and transmitting an interrogation signal;
   an interrogation signal receiver for receiving the interrogation signal and a response signal generator for generating and transmitting a response signal in response to reception of the interrogation signal, both the interrogation signal receiver and the response signal generator being situated on the second object;
   a response signal receiver situated on the first object, for receiving the response signal; and
   an evaluation unit for determining the distance between the first and second objects by determining a distance-indicative phase difference between the transmitted interrogation signal and the transmitted response signal; wherein,
   the evaluation unit comprises an exclusive-OR gate; and
   the interrogation signal and a corresponding received response signal are fed to respective inputs of the exclusive-OR gate.

4. The distance-determining apparatus according to claim 3, wherein:
   the evaluation unit comprises a root-mean-square value formation unit connected downstream of the exclusive-OR gate; and
   a threshold value comparison unit connected downstream of the root-mean-square value formation unit compares the root-mean-square voltage value output by the root-mean-square value formation unit with a predeterminable voltage threshold value which is one of fixed and variable.

5. The distance-determining apparatus according to claim 3, wherein:
   the output signal of the exclusive-OR gate is passed to a charging terminal of a capacitor; and
   charging time-determining means are provided, which determine the charging time of the capacitor until a predeterminable capacitor voltage threshold value is reached, which is one of fixed and variable.

6. Apparatus for determining a distance between first and second objects, comprising:
   an interrogation signal generator situated on the first object for generating and transmitting an interrogation signal;
   an interrogation signal receiver for receiving the interrogation signal and a response signal generator for generating and transmitting a response signal in response to reception of the interrogation signal, both the interrogation signal receiver and the response signal generator being situated on the second object;
   a response signal receiver situated on the first object, for receiving the response signal; and
   an evaluation unit for determining the distance between the first and second objects by determining a distance-indicative phase difference between the transmitted interrogation signal and the transmitted response signal; wherein,
   the interrogation signal generator includes means for generating a digital code word as the interrogation signal;
   the response signal generator includes means for generating a code word corresponding to the interrogation signal code word as a response signal; and
   the evaluation unit determines a phase difference between the interrogation signal code word and the response signal code word.

7. An electronic security system, comprising:
   at least one security unit arranged on a first object to be secured;
   at least one authorizing authentication element as a second object, which can be carried by the user; and
   authentication element identification means for ascertaining whether an authorizing authentication element is situated within a predeterminable range of the object to be secured, wherein the authentication element identification means include means for determining a distance of an identified authorizing authentication element of the second object from the first object, which is to be secured, having
   an interrogation signal generator situated on the first object for generating and transmitting an interrogation signal;
   an interrogation signal receiver for receiving the interrogation signal and a response signal generator for generating and transmitting in response to reception of the interrogation signal, a response signal that is substantially congruent to said interrogation signal, delayed by a signal processing duration of said response signal generator, both the interrogation signal receiver and the response signal generator being situated on the second object;

a response signal receiver situated on the first object, for receiving the response signal;

a signal delay unit situated on the first object, to which signal delay unit the generated interrogation signal is fed in parallel with an interrogation signal transmission unit, and which signal delay unit forwards the said interrogation signal, delayed by the time duration that corresponds to the signal processing duration of the response signal generator, for comparison with the received response signal; and an evaluation unit which compares the delayed interrogation signal forwarded by the signal delay unit with the received response signal, and determines the distance between the first and second objects by determining a distance-indicative phase difference between the delayed interrogation signal forwarded by the signal delay unit and the transmitted response signal.

* * * * *